Aug. 4, 1964   J. A. CARPENTER ETAL   3,143,325
CABLE SUPPORT

Filed Aug. 9, 1962   2 Sheets-Sheet 1

Inventors:
John A. Carpenter
Arley D. Carpenter
By Henry H. Snelling
their Attorney Aug. 4, 1964    J. A. CARPENTER ETAL    3,143,325
CABLE SUPPORT
Filed Aug. 9, 1962    2 Sheets-Sheet 2
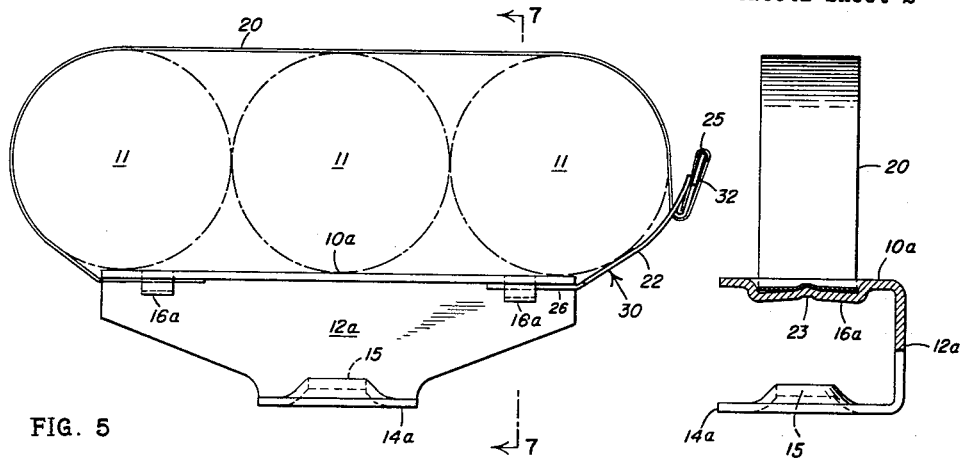
FIG. 5
FIG. 7
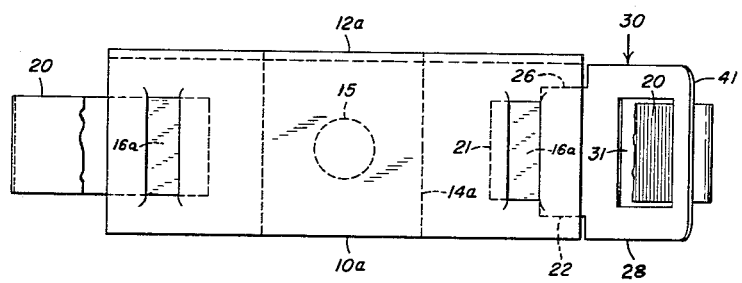
FIG. 6
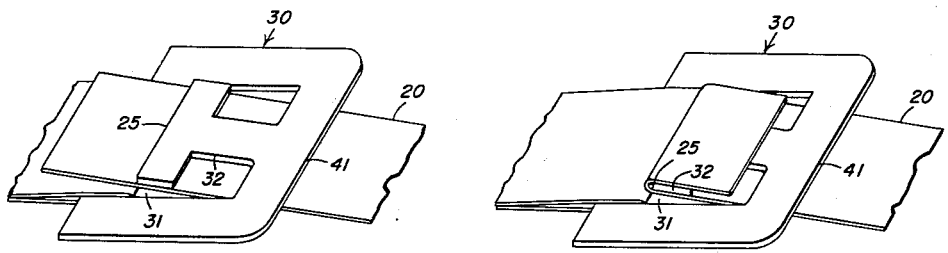
FIG. 9
FIG. 10
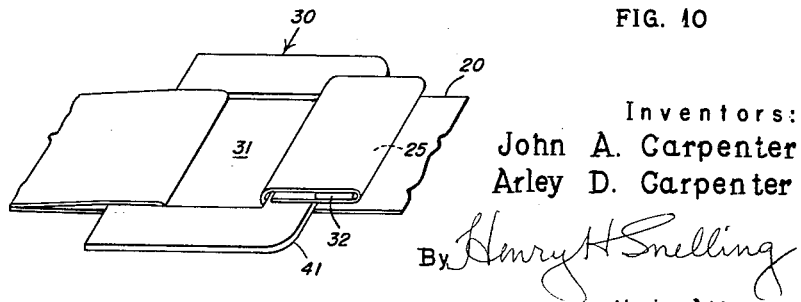
FIG. 11
Inventors:
John A. Carpenter
Arley D. Carpenter
By Henry H Snelling
their Attorney United States Patent Office 3,143,325
Patented Aug. 4, 1964

3,143,325
CABLE SUPPORT
John A. Carpenter, 2705 E. Saginaw Way, Fresno 3,
Calif., and Arley D. Carpenter, 7118 La Tijera Blvd.,
Los Angeles 45, Calif.
Filed Aug. 9, 1962, Ser. No. 215,894
8 Claims. (Cl. 248—68)

The present invention relates to a cable support adapted to secure one or more cables in a durable and efficient manner. The cable support is useful in a variety of locations such as in ships, rolling stock, buildings, and elsewhere. The cable support of the invention is secured to any type of structure at a desired point with means carried by the support and adapted to encircle the cable or cables to hold the same securely to the support so that shifting of the cable will not occur.

The principal object of the invention is the provision of a cable support which is of simple construction, easily installed by an inexperienced operator, inexpensive in cost of manufacture, and generally superior to cable supports now known to the inventors.

A further object of the invention is to provide a single band comprising a cinch strap of relatively heavy metal having attached to it a clamp strap of normal resiliency. The composite strap while frequently permanently attached to the heavy metal base of a cable support may be used alone or to aid in securing cables or pipes to the cable support by means of an additional band in addition to the structure of the preferred embodiment.

In the drawings:

FIG. 5 is a front view of a larger size cable support;

FIG. 6 is a top plan of FIG. 5;

FIG. 7 is a section on line 7—7 of FIG. 5;

FIGS. 9, 10 and 11 are perspective views showing the steps of using a combined clamp and cinch strap, which may or may not be fastened to the support base.

Figure 3:
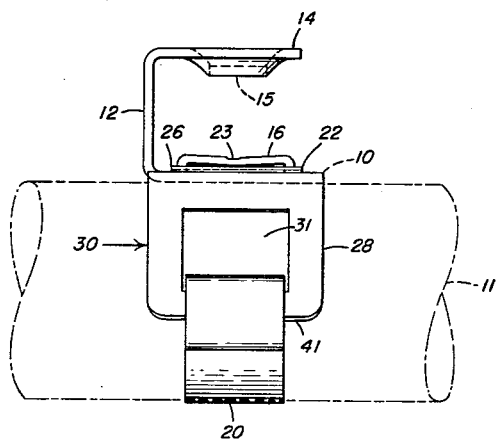
FIG. 3 is a side elevation.

The present invention may be considered as an improvement over the structure shown in our Patent No. 2,560,845 of July 17, 1951, and has the same range of use but is quicker and easier to apply.

The cable support in the small size illustrated in FIG. 1 consists of a base formed by bending a piece of relatively heavy sheet metal twice at right angles to form a web 10 to engage either above or below a cable, pipe, or similar object 11, a side flange 12 which would usually be in a vertical position, and a lug 14 pierced as at 15 to accommodate a bolt or other fastening for securing the base to a hanger or other structure. While the relatively thin metal straps which are used with these bases may be welded to the web 10, we prefer to strike from the web toward the lug a loop 16, such as will be described later.

Figure 4:
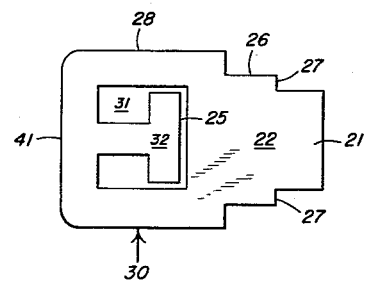
FIG. 4 shows a cinch strap.

In the single cable support a clamp strap 20 of selected length has one end slipped under the loop 16 and over this end the reduced portion 21 of the cinch strap 22 is inserted and then the loop is struck a heavy blow at about the center point, as noted by the quite deep indentation 23, thus insuring a permanent connection. The cinch strap has a transverse edge 25 which forms a fulcrum about which the free end of the clamp strap 20 may be bent and this edge while it may be at the free end of the cinch strap, it is preferred that it be as later described and as shown best in FIG. 4. Here the width of the cinch strap is enlarged, as at 26, to provide shoulders 27 to engage the securing loop 16 struck from the web platform 10 and again is enlarged, as at 28, to provide what may be called a frame or buckle 30. Inside of the opening 31 in the oblong frame is a T-shaped member 32, the outer edge of the head of which is the fulcrum 25. The width and thickness of the clamp straps 20 are uniform in all sizes but will vary in length for the different dimensions of the support base web 10. The cinch straps are preferably identical in all sizes.

Referring now to FIGS. 5, 6 and 7 showing a larger size base and therefore capable of supporting a plurality of cables, pipes or other similar objects, these latter being shown in this figure as resting upon rather than supported below the web platform 10a. The lugs 14a may be domed about the hole 15 for flush mounting, the side flanges 12a are enlarged as at 35 toward the web 10a which is about three times as long as the lug in this size and preferably slightly wider than the lug to better support the cables. The single loop 16 of FIG. 1 is here replaced by a plurality of loops 16a, one for the cinch strap 22 and the other for the clamp strap 20, as the ends of these straps are fairly far apart in this size of support.

Figure 1:
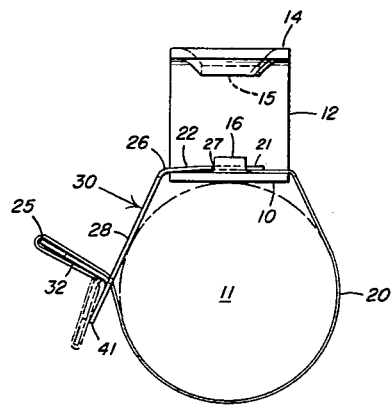
FIG. 1 is a front view of one form of cable support supporting a small cable beneath and awaiting final bending.
Figure 2:
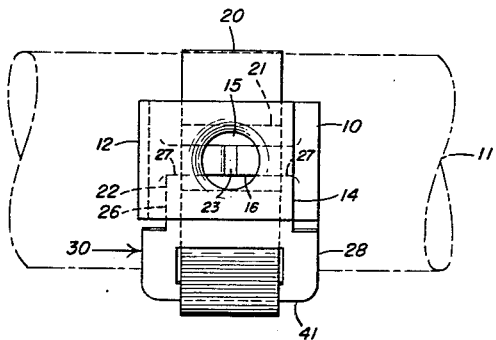
FIG. 2 is a top plan view of the structure of FIG. 1.

The operation, uses and advantages of the device just described are as follows:

Cables or cables are postioned on the web 10a with their axes transverse, only one cable usually being used with the small size shown in FIG. 1. Four or more cables may be so supported on the larger sizes or may be hung beneath the web platform 10a. If the cable is held beneath the web 10, as in FIG. 1, the clamp strap 20 is brought down and around the cable, or cables, and its free end is inserted in the space 40 (FIGURE 8) between margin of the rectangular opening 31 and the fulcrum edge 25. The T-shaped member 32 then bends upwardly and outwardly and the workman with a pair of pliers, for example, tensions the cable, cuts off the excess length of the clamping strap with the usual snips and bends the now free end so that it will pass over the fulcrum edge 25 and have a portion of the same length or shorter than the tongue or T 32. This tongue or T, with the clamp strap tightly on both sides of it by use of the pliers, is now bent through a large angle of about 180° so the unit thus formed will touch the outer bar 41 of the frame on the lower side (FIG. 1) while the cable 11 is drawn tightly against the web 10. Both the clamp strap 20 and the enclosed T 32 as a unit and also the bar 41 which are now as shown in FIG. 1, may be farther bent to bring them into engagement with the portion of the clamp strap engaging the cable 11, this additional bending being preferable but not essential.

It is also within the purview of the invention to secure cables having different diameters with the cables closely nested together and held by a single clamp strap. Obviously, the operator installing the cables will have estimated the number and size of clamps necessary to do the work of properly supporting all the cables. The various cable supports will then be secured to a suitable foundation member such as a wall or a channel bracket by screws, bolts or other fastening members passing through the openings 15 in the lugs. In the previous types of cable supports, we have had the workman select the length of the clamp strap necessary but in the present type we have found that it is more economical to have a small amount of wastage which is more than compensated for by the time saved and therefore we fasten the maximum length of clamp strap appropriate to each of the small, medium or large size bases and permanently secure such lengths of clamp strap to the base web at the factory at the same time the cinch strap is so fastened. This saves materially in time as the installer merely selects the proper size of combined base with its two straps and starts to work. Both straps are as usual made from fully annealed stainless steel, the cinch strap 30 preferably being about twice the thickness of the clamp strap 20, which is about .012" as normally used in this art. The latter may or may not be cadmium plated, both types being readily available.

Figure 8:
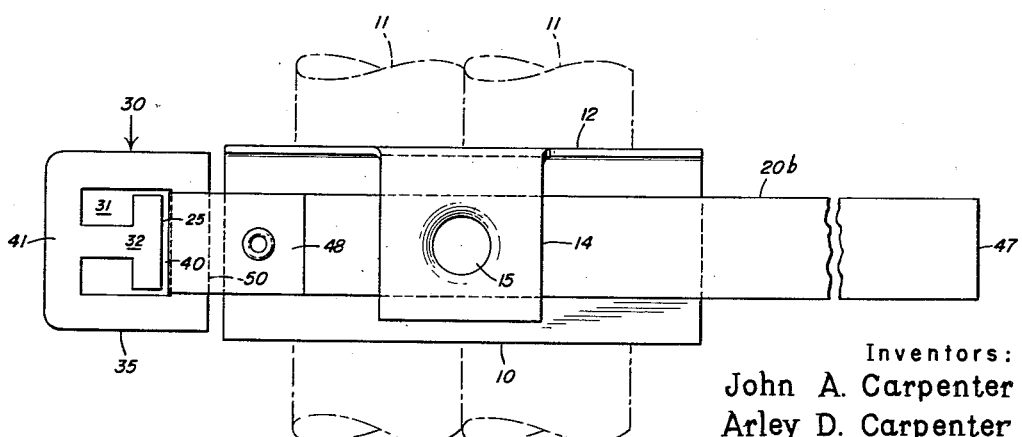
FIG. 8 shows a modification.

The frame and T of the cinch strap may be secured to the clamp strap directly to form a combined strap. This is shown in FIG. 8 as a modification in which the hollow frame or buckle 30 is rectangular, the free end bar 41 of the frame being parallel to the similar shaped bar 50 which is looped by the clamp strap and the end 48 of the loop is secured by a rivet or other fastening means which may also secure the combined strap to the base web 10 or 10a on its upper surface as the cable or pipe is shown in this figure as hung beneath the base web. The free end 47 of the clamp strap is passed beneath the cable and then upward through the small space 40 between the rounded edge of the loop and the fulcrum edge 25 and is then bent as in the other forms and as described in connection with the remaining figures.

FIGS. 9, 10 and 11 show the successive steps of wrapping such a combined strap made fastening the clamp strap 20 to the bar 50 of the frame as left by cutting off the intermediate portion. The clamp strap may be fastened in any usual manner but is preferably secured to the bar 50 or may be looped about this bar and the near end welded, riveted or otherwise secured to the main body of the clamp strap. In FIG. 9 the clamp strap 20 is pulled tight, then its free end is bent to the right after being snipped to correct length, formed to embrace the tongue or T member 32 on both sides as previously described and finally as in FIG. 11 the entire unit of folded clamp strap with the T-member tightly therein is bent over about 180° and flattened against the outside of the clamp strap.

What we claim is:

1. A cable support comprising a base having a web platform to be engaged transversely by a cable, a clamp strap secured to the platform, and a cinch strap secured to the platform in alignment with the clamp strap, said clamp cinch strap comprising a frame surrounding an integral T-shaped member the edge of the head of which forms a fulcrum about which the clamp strap is to be bent to embrace the T-shaped member on both sides.

2. The cable support of claim 1 in which the clamp strap surrounds the cable, is bent to engage tightly both sides of the tee member and both the tee member and the bend of the clamp strap are bent as a unit against the proximate portion of the frame.

3. The cable support of claim 1 in which the clamp strap includes a rectangular frame, and a succession of narrower portions, the narrowest portion being permanently secured to the web platform.

4. The cable support of claim 3 in which the two straps are permanently secured to the web platform, the cinch strap is of stiffer metal than the clamp strap, and the clamp strap passes beneath the web platform.

5. A combined clamp and cinch strap for use in securing cables to a support, comprising a rectangular open frame having a T member extending into the frame opening with the stem of the T integral with an end bar of the frame and the head of the T proximate to but spaced from the opposite end bar of the frame, and a metal band secured to the second mentioned end bar, said frame and T member being a metal stamping of greater resistance to bending than the metal of said band whereby the free end of the band is to be inserted between the head of the T member and said second end bar, then bent over the T head and finally both band and the T are to be bent as a unit to rest against the portion of the band next to the first mentioned end bar.

6. A cable support comprising a cable supporting platform, an elongated clamp strap secured thereto, a cinch strap secured to the platform in alignment with the clamp strap and including a frame defining a central opening bounded in part by parallel transverse end bars, a tongue integral with the frame, and having a readily bendable narrow junction with one of said end bars and having at its opposite end a straight fulcrum parallel to and of about the same length as one edge of the said central opening, the fulcrum being spaced from the proximate edge of the opening sufficiently to permit passage therebetween of the free end of the clamping strap, said free end being bent 180° about the fulcrum to engage both sides of the tongue and then being bent with the enclosed tongue through an obtuse angle.

7. The cable support of claim 6 in which the platform is one web of a channel-shaped supporting base, the cinch strap is approximately twice the thickness of the clamping strap, and the opening is oblong.

8. The cable support of claim 7 in which the platform end of the clamping strap is secured to the frame.

References Cited in the file of this patent

UNITED STATES PATENTS

| | | |
|---|---|---|
| 948,585 | Bartran | Feb. 8, 1910 |
| 1,270,193 | Nelson | June 18, 1918 |
| 1,973,823 | Morten | Sept. 18, 1934 |
| 2,273,571 | Hafemeister | Feb. 17, 1942 |
| 2,939,664 | Wesseler | June 7, 1960 |

FOREIGN PATENTS

| | | |
|---|---|---|
| 667,848 | Germany | Nov. 21, 1938 |